May 26, 1925. 1,539,370
P. RAUCH
CUT-OUT FOR CISTERN WATER PIPES
Filed Oct. 10, 1923    3 Sheets-Sheet 2
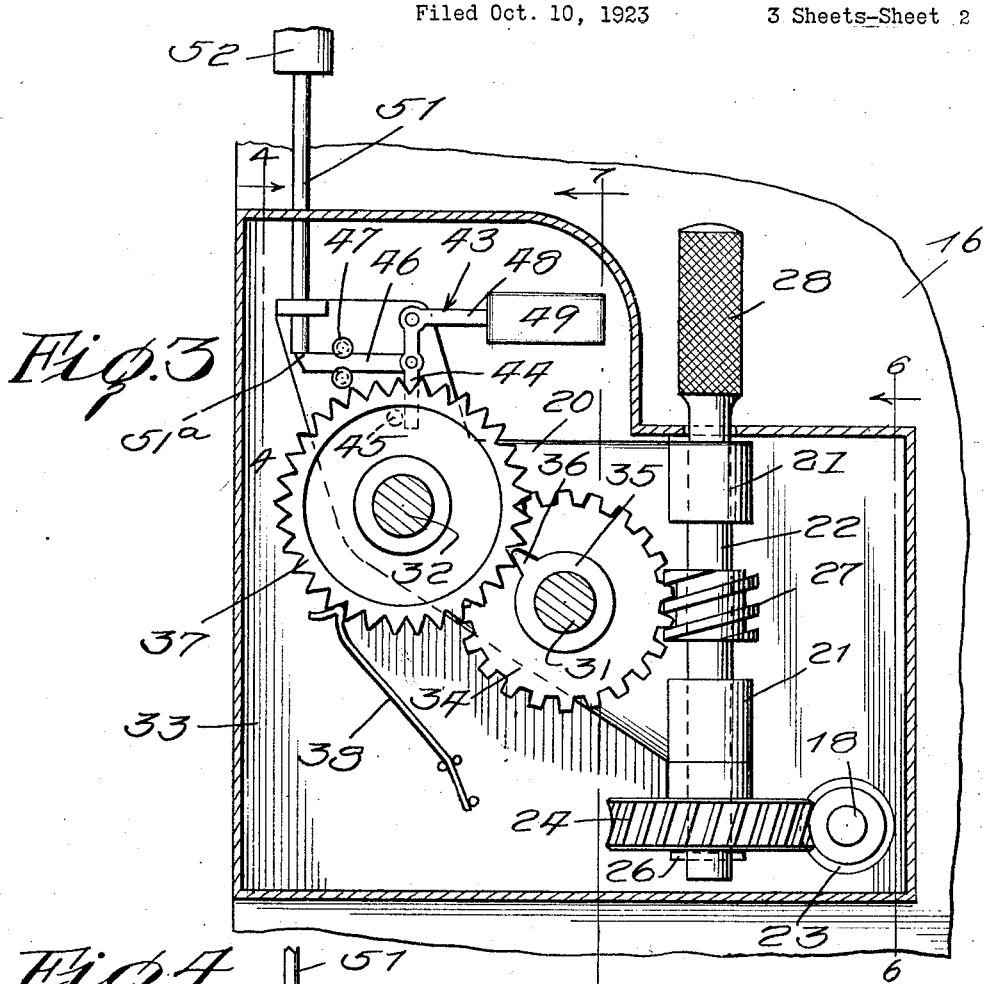
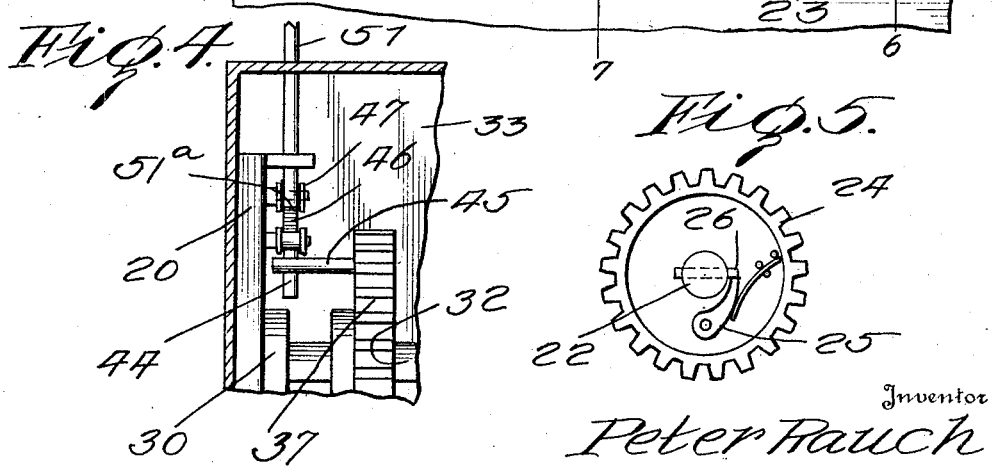
Inventor
Peter Rauch
By Watson E. Coleman
Attorney May 26, 1925.
P. RAUCH
CUT-OUT FOR CISTERN WATER PIPES
Filed Oct. 10, 1923      3 Sheets-Sheet 3
1,539,370
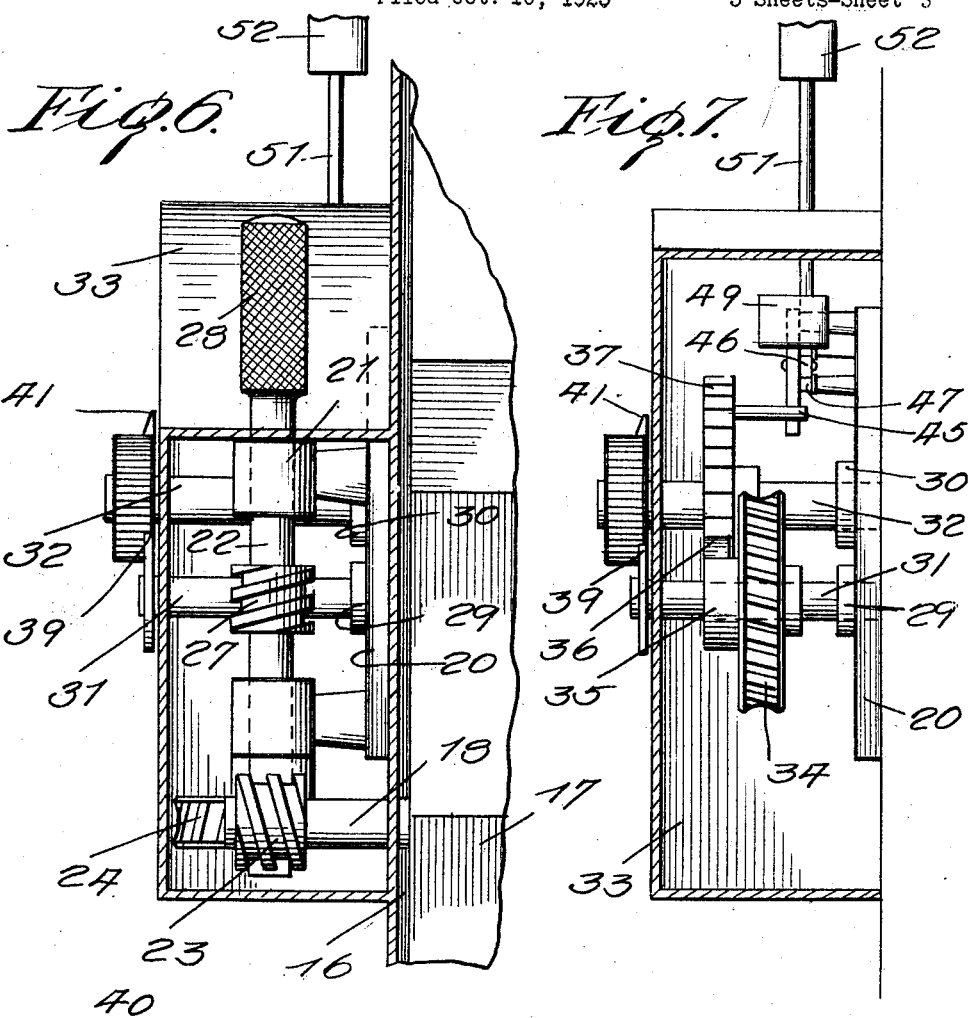
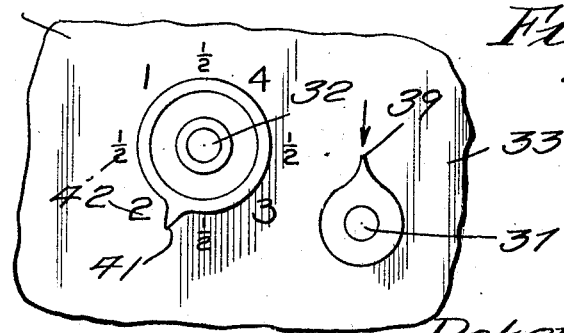
Inventor
Peter Rauch
By Watson E. Coleman
Attorney Patented May 26, 1925.

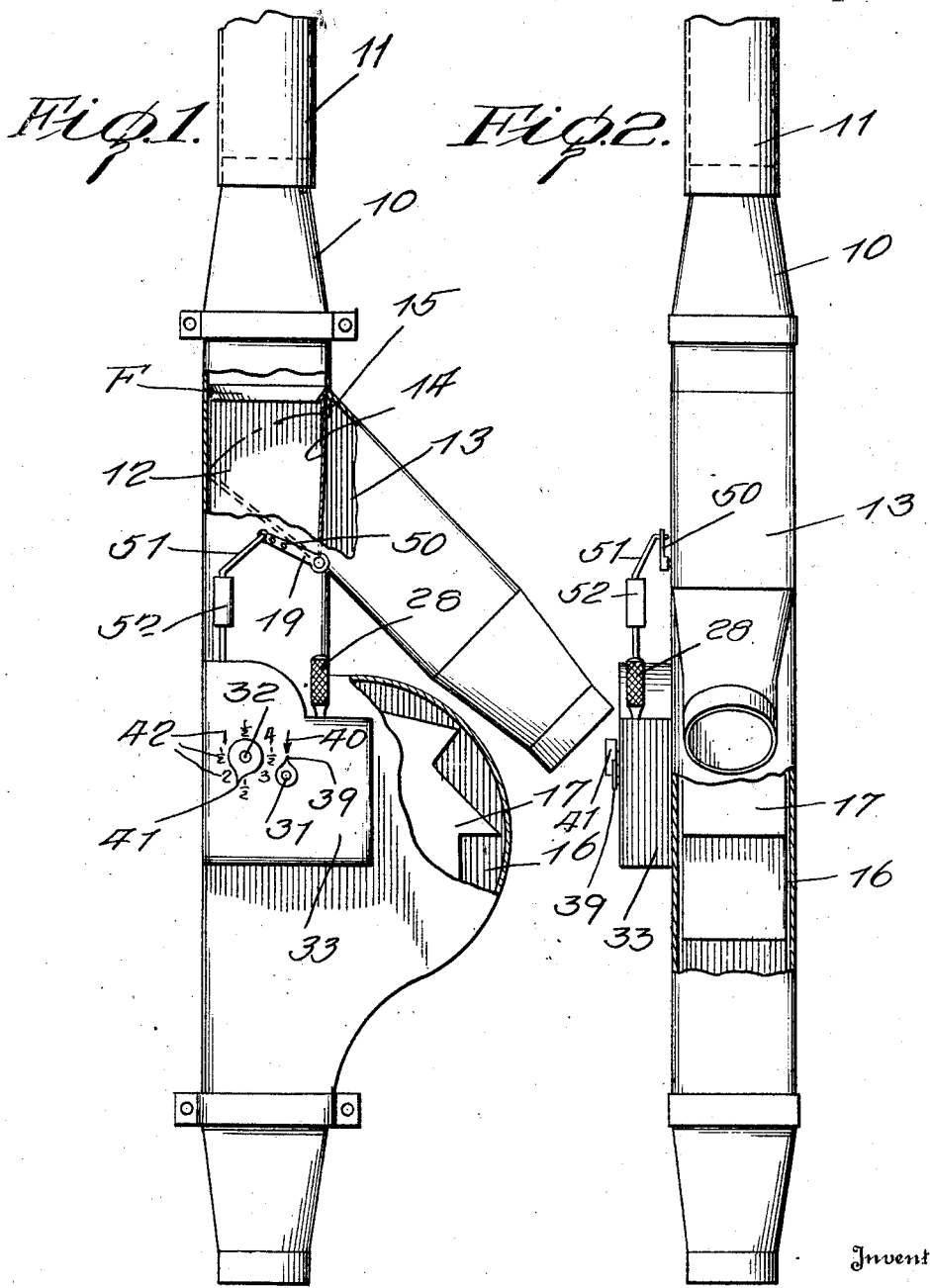

1,539,370

UNITED STATES PATENT OFFICE.

PETER RAUCH, OF BELOIT, KANSAS, ASSIGNOR OF ONE-HALF TO JACOB J. KINDSCHER, OF BELOIT, KANSAS.

CUT-OUT FOR CISTERN WATER PIPES.

Application filed October 10, 1923. Serial No. 667,747.

*To all whom it may concern:*

Be it known that I, PETER RAUCH, a citizen of the United States, residing at Beloit, in the county of Mitchell and State of Kansas, have invented certain new and useful Improvements in Cut-Outs for Cistern Water Pipes, of which the following is a specification, reference being had to the accompanying drawings.

This invention relates to improvements in cut-outs for cistern water pipes and has for an important object thereof the provision of a novel construction to control the water discharged from a roof so that a given amount of the water may be conducted to a sewer or other take-off until the roof has been sufficiently washed to insure the cleanliness of the balance of the water which is then deflected to a cistern or other reservoir.

It is a wellknown fact that in many sections of the country it is necessary to employ cisterns for the collection of drinking water and that these cisterns, even though provided with a filter, ordinarily becomes so dirty due to the collection of dust and dirt which is washed from the roof used as a collection point that they are useless, the water being discolored, ill-smelling and unfit to drink. It is further known that by deflecting the water initially passing from the roof the dirt collected upon the roof will be carried away with this water and the remaining water may be used for drinking purposes. The amount of water which must be deflected to the sewer depends entirely upon the length of time between rains and the character of the surrounding country. If the soil of the surrounding country be light so that it is easily stirred by the wind a greater amount will collect upon the roof and if the period between rains is long the amount will increase proportionately.

An important object of this invention becomes to provide a device for deflecting a portion of the water to the sewer which is readily adjustable to control the amount of water so deflected and which at the same time may be very cheaply and simply produced.

A further and more specific object of the invention is to provide mechanism for shifting a valve controlling the direction of water from the roof to the cistern or sewer including a water wheel arranged in the sewer line and operated by the water passing from the roof to shift the valve to deflect the water to the cistern.

A still further object of the invention is to provide a device of this character which may be readily inserted in cistern lines without in any manner altering the present construction thereof.

These and other objects I attain by the construction shown in the accompanying drawings, wherein for the purpose of illustration is shown a preferred embodiment of my invention and wherein:—

Figure 1 is a side elevation of a cistern fitting constructed in accordance with my invention, parts being broken away;

Figure 2 is an edge elevation thereof, a portion of the casing being broken away;

Figure 3 is a vertical section taken through the operating mechanism;

Figure 4 is a section on the line 4—4 of Figure 3;

Figure 5 is a bottom plan view showing the mounting of the gear 24 on the shaft;

Figure 6 is a section on the line 6—6 of Figure 3;

Figure 7 is a section on the line 7—7 of Figure 3; and

Figure 8 is an enlarged fragmentary side elevation showing the dial arrangement.

Referring now more particularly to the drawings, the numeral 10 generally designates a fitting adapted to be inserted in the down-spout or pipe 11 leading from the point of collection. This fitting is branched to provide a sewer outlet 12 and a cistern or reservoir outlet 13. At the branch a valve 14 is pivoted and swingable to close either the cistern outlet or the sewer outlet. The sewer outlet is enlarged, as at 16, to form a casing for a water wheel 17, the shaft 18 of which projects through the walls of the casing and is rotatable therein. The valve 14 hereinbefore mentioned is likewise secured to a shaft journaled in the walls of the fitting 10 for a rocking movement, the outer end of this shaft being provided with an arm 19.

Secured to the walls of the enlargement 16 is a base 20 having projecting outwardly therefrom a pair of spaced bearings 21 in which is journaled a shaft 22. The adjacent end of the shaft 18 of the water wheel has secured thereto a worm 23 which engages with a worm wheel 24 rotatably mounted upon the shaft 22. Mounted upon the gear 24 is a spring-pressed dog 25 coacting with the shaft 22 and more particularly with a pin 26 carried by the shaft to hold the gear 24 against rotation with relation to the shaft in one direction. The shaft 22 is further provided with a worm 27 and the upper end thereof is knurled, as indicated at 28.

The base 20 further provides step bearings 29 and 30 for the inner ends of shafts 31 and 32. The outer ends of these shafts are journaled in openings formed in a casing 33 of such size that the gearing and shafts are enclosed, the knurled end 28 of the shaft 22 projecting therefrom as well as a portion of the upper end of the base as will hereinafter more fully appear. Within the casing the shaft 31 has mounted thereon a worm wheel 34 meshing with the worm 27 of the shaft 22 and a disk 35 having a single tooth indicated at 36. The shaft 32 within the casing is provided with a gear wheel 37 with which the tooth 36 engages to shift the gear wheel 37, one tooth at each revolution of the shaft 31. Rotation of the shaft 32 through its gear wheel 37 is resisted by a spring 38 pressing against the periphery of the gear. Exteriorly of the casing the shaft 31 is provided with a pointer 39 coacting with a stop mark 40 upon the casing and the shaft 32 is provided with a pointer 41 coacting with a circularly arranged set of indicia 42.

Above the shaft 32 a bell crank lever 43 is pivoted to the base 20, one arm 44 of which projects into the path of a pin 45 carried by and extending inwardly of the inner face of the gear 37 of the shaft 32. Pivotally connected to this arm at points spaced from the pivot point thereof is a trip member 46 which extends between guides 47 carried by the base. The other arm 48 of the bell crank which is horizontally directed is counterweighted, as indicated at 49, and accordingly tends to force the trip member 46 through the guides 47 to extended or latching position. The arm 19 of the valve is provided with a plurality of openings 50 in which is selectively engageable one end of an arm 51, the opposite end of which normally rests upon the free end of the trip member 47, as indicated at 51ª. This arm is provided with a weight 52. The casing 33 hereinbefore referred to preferably encloses the bell crank lever 43, trip member 46, the guides 47 thereof and the lower end of the arm 51 forming a guide for this lower end.

In the use of the device the connections having been made of the fitting 10 to the supply pipe 11 and of the branches 12 and 13 to the sewer and reservoir respectively, a computation is made of the amount of water, as for example in barrels, which must pass through the pipe 11 before the roof is cleansed. The shaft 22 is then rotated by means of the projecting knurled end 28 thereof to place the single tooth 36 of the disk 35 out of engagement with the gear 37, the rigid connection of the gear 24 with the shaft 22 permitting this rotation. The pointer 39 of the shaft 31 coinciding with the marker 40 indicates that the pointer is cleared from the disk 37 and in the proper position. The knurled cap 53 of the shaft 32 is then engaged and the shaft rotated until the pointed 41 thereof coincides with a selected graduation. The arm 51 is then elevated to a position where the valve 14 closes the branch 13 of the fitting 10, at which time the lower end of the arm will rest upon the trip member 47 to hold the valve in this position. With the parts set in this position, in event of a rain water passing down the pipe 11 will be directed through the branch 12 and will accordingly cause the rotation of the water wheel 17. This water wheel will drive the shaft 22 through the gear 24 with the result that the shaft 31 is rotated and a step by step motion applied to the shaft 32. When the pin 45 of the gear 37 comes into engagement with the arm 44 of the bell crank 43, this arm will be withdrawn drawing with it the trip member and when the trip member has been sufficiently withdrawn the arm 41 by reason of its weight will fall causing the valve 14 to shift and close the entrance to the branch 12, with the result that water is now directed through the flange 13 and to the reservoir. If an inspection shows that the amount of water passed through the branch 12 is sufficient all that is necessary to reset the machine is to elevate the arm 51 to permit the trip member to again engage beneath the same and reset the device as it was before. If at any time it is desired to change the setting this may be readily accomplished so that it is easy to compensate for long periods of drought or high winds carrying with them a great accumulation of dust. Particular attention is now directed to Figure 1. From this figure it will be noted that a flange 15 is provided against which the free edge of the valve rests when in position to close the cistern outlet. The sewer outlet is in direct line with the body of the fitting 10 and the body of the fitting 10 is provided interiorly with a frusto-conical flange F which directs water outwardly from the walls of the fitting so that none of this water will engage against the valve to pass about the edges thereof. Thus it is assured that none of the water employed to wash the roof passes to the cistern. It will, of course, be understood that a device of this character is capable of a considerable range of change and modification without in any manner departing from the spirit of the invention hereinbefore set forth and that the specific details are set forth as an illustration of a preferred construction and are not to be considered in a limiting sense except as hereinafter claimed.

I claim:—

1. In a cistern system, a fitting receiving water from a source of supply and having branches communicating with a sewer and with the cistern, a valve controlling the passage of water through the fitting to the sewer to direct the same to the sewer or cistern and normally positioned to direct the water to the sewer, a water-wheel in the sewer branch, means operated by the water-wheel for shifting the valve to close the sewer branch and open the cistern branch adjustable to determine the amount of water passing through the sewer branch including an operating arm for the valve, a trip associated with the arm and in one position thereof holding the valve through said arm in position closing the cistern branch, a rotatable member for shifting the trip out of said position, means yieldably resisting rotation of the rotatable member, a driving member for the rotatable member intermittently engaging the same, and a driving connection between the driving member and water-wheel including a part shiftable to disconnect the driving member and water-wheel while itself remaining connected to the driving member to drive the same, said part being manually operable.

2. In a cistern system, a fitting receiving water from a source of supply and having branches communicating with a sewer and with the cistern, a valve controlling the passage of water through the fitting to the sewer to direct the same to the sewer or cistern and normally positioned to direct the water to the sewer, a water-wheel in the sewer branch, means operated by the water-wheel for shifting the valve to close the sewer branch and open the cistern branch adjustable to determine the amount of water passing through the sewer branch including an operating arm for the valve, a weighted member connected with the arm, a trip positionable beneath the lower end of the weighted member to support the same, a casing into which the lower end of the member extends, a trip within the casing, a pair of shafts rotatably mounted within the casing, one having a gear provided with a trip operating member for shifting the same from beneath the lower end of the weighted member, the other shaft having a single tooth engaging the gear of the first named shaft at each rotation of said other shaft, a gear on said other shaft, a connection between said gear and the water-wheel including a third shaft, a gear on the water-wheel shaft, a gear on the third shaft meshing with the gear of the water-wheel shaft, a clutch connection between the gear of the third shaft and the third shaft disconnectible when the third shaft is longitudinally shifted, a worm gear on the third shaft meshing with the gear of the second shaft, the third shaft having a portion extending outwardly of the casing whereby it may be longitudinally shifted and manually rotated, means for yieldably holding the first shaft against rotation, and means exteriorly of the casing for rotating the first named shaft.

3. In a cistern system, a fitting receiving water from a source of supply and having branches communicating with a sewer and with the cistern, a valve controlling the passage of water through the fitting to the sewer to direct the same to the sewer or cistern and normally positioned to direct the water to the sewer, a water-wheel in the sewer branch, means operated by the water-wheel for shifting the valve to close the sewer branch and open the cistern branch adjustable to determine the amount of water passing through the sewer branch including an operating arm for the valve, a weighted member connected with the arm, a trip positionable beneath the lower end of the weighted member to support the same, a casing into which the lower end of the member extends, a trip within the casing, a pair of shafts rotatably mounted within the casing, one having a gear provided with a trip operating member for shifting the same from beneath the lower end of the weighted member, the other shaft having a single tooth engaging the gear of the first named shaft at each rotation of said other shaft, a gear on said other shaft, a connection between said gear and the water-wheel including a third shaft, a gear on the water-wheel shaft, a gear on the third shaft meshing with the gear of the water-wheel shaft, a clutch connection between the gear of the third shaft and the third shaft disconnectible when the third shaft is longitudinally shifted, a worm gear on the third shaft meshing with the gear of the second shaft, the third shaft having a portion extending outwardly of the casing whereby it may be longitudinally shifted and manually rotated, means for yieldably holding the first shaft against rotation, and means exteriorly of the casing for rotating the first named shaft, said trip automatically assuming the position beneath the end of the weighted member when the weighted member is elevated.

In testimony whereof I hereunto affix my signature.

PETER RAUCH.